Aug. 25, 1964 R. A. PENDLETON 3,145,944

MECHANICAL APPARATUS FOR MOUNTING A REEL ON A SUPPORT HUB

Filed March 10, 1960 2 Sheets-Sheet 1

INVENTOR:
Robert A. Pendleton,
BY Bair, Freeman & Molinare
ATTORNEYS.

MECHANICAL APPARATUS FOR MOUNTING A REEL ON A SUPPORT HUB

Filed March 10, 1960 2 Sheets-Sheet 2

INVENTOR:
Robert A. Pendleton,
BY Bair, Freeman & Molinare
ATTORNEYS.

3,145,944
MECHANICAL APPARATUS FOR MOUNTING A REEL ON A SUPPORT HUB

Robert A. Pendleton, Dedham, Mass., assignor to Minneapolis-Honeywell Regulator Company, Minneapolis, Minn., a corporation of Delaware Filed Mar. 10, 1960, Ser. No. 14,091
6 Claims. (Cl. 242—68.1)

Figure 1:
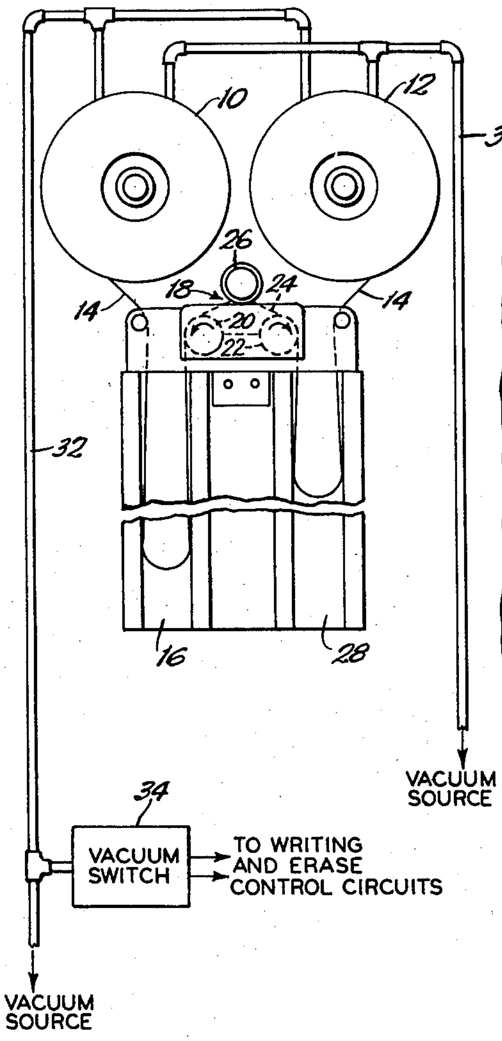

This application relates generally to apparatus for handling flexible strip members, and more particularly to new and improved apparatus for handling elongated tapes, such as magnetic record tapes of the type having informational data stored thereon.

In a patent of the present inventor, issued as Patent Number 2,998,206, there is disclosed apparatus for coupling a reel to a rotatable shaft, of the type used for example, in a magnetic tape handling mechanism for a magnetic recording and playback apparatus. In order that the locking of the reel to the shaft and its removal therefrom be facilitated, the apparatus of said patent comprises fluid pressure means which is utilized to create a high coupling force between a reel and a drive hub therefor so that the reel is firmly held when it is in operative position. One form of fluid pressure is disclosed as a pressure differential created by providing a subatmospheric pressure or vacuum which may cooperate with the ambient atmospheric pressure to effect the desired coupling. Thus, in the apparatus of my co-pending application, the pressure differential, when active, serves to firmly engage the reel to the drive hub, and, when removed, serves to condition the apparatus to permit the ready removal of the reel from its coupled position.

It is a general object of this invention to provide new and improved apparatus for coupling a reel to a drive hub.

More particularly, it is one object of this invention to provide a reel assembly which is adapted to be coupled to a driving mechanism by a combination of fluid pressure and mechanical locking action to prevent any accidental decoupling of the reel from the drive hub when the reel is in its operative position.

In accordance with a specific feature of this invention, selectively releasable, mechanical locking apparatus is provided on the drive hub which serves to automatically clamp the reel to the hub when the reel is placed thereon. In one illustrative embodiment of the invention, as described in greater detail hereinbelow, the locking apparatus comprises a cone-like collapsible lock member having a plurality of resilient fingers adapted to be depressed by the passage of the reel hub thereover as the reel is being positioned on the drive shaft. When the reel is placed in its operative position, the resilient arms return to their normal state and serve to lock or clamp the reel firmly against the reel drive shaft. In addition, a subatmospheric fluid pressure or vacuum in the chamber between the reel and the drive hub also creates a high coupling force so that the reel is firmly held in its operative position.

Accordingly, it is an other object of this invention to provide novel apparatus for coupling a reel to a drive hub therefor wherein the reel is firmly held to the drive hub by means of a fluid pressure differential and by the action of a collapsible member having resilient finger means for mechanically locking the reel on the drive shaft of said drive hub.

In accordance with a further feature of this invention a manually operable slide valve and push cup assembly is provided in operative association with the collapsible lock member to facilitate the release of the reel whenever its removal from the driving mechanism is desired. The manual actuation of the slide valve and push cup assembly advantageously provides two functions. First, it permits atmosphere to vent the chamber between the reel and the drive hub, thereby releasing the pressure differential coupling force acting on the reel. Secondly, it depresses the fingers of the collapsible lock member to permit the reel to be removed from the drive shaft.

Thus, it is a further object of this invention to provide manually operable means for releasing both the pneumatic and the mechanical clamping forces utilized in coupling a reel to its driving mechanism.

It is still a further feature of this invention to provide new and improved apparatus for coupling a reel to a driving mechanism comprising novel interlock means for preventing an accidental data transfer of data with respect to selected reels.

In magnetic tape handling mechanisms of the type used with magnetic recording and playback apparatus, it often is advantageous to utilize certain reels having control and information data pre-recorded thereon. Such reels may be referred to as master reels, and since the data pre-recorded thereon is to be preserved for repeated use, there is the danger that such data may unintentionally be destroyed by accidental writing or erasure on such master reels.

In accordance with another specific feature of this invention, the hub of a master reel is provided with unique interlock means adapted to cooperate with the slide valve and push cup assembly to prevent any such accidental writing or erasing on a master reel. In one specific embodiment of the invention, the interlock means takes the form of a retainer ring which serves to maintain the slide valve and push cup assembly in a half-cocked or intermediate position wherein atmosphere is leaked to a vacuum switch conduit to keep the vacuum switch in its non-operated condition. As the writing and erase circuits are connected to the vacuum switch, no accidental writing or erasure of data can take place during this time. The actuation of the vacuum switch may obviously be reversed in its effect in the associated circuits. Thus, the closing of the switch may be used to prevent the writing or erasing of data on the tape.

When a reel, which is not a master reel, is coupled to the driving mechanism, the slide valve and push cup assembly returns to its operative position to remove atmosphere from the vacuum switch conduit. At this time, the subatmospheric pressure applied to the vacuum switch operates the switch to control the operation of the writing and erase circuits.

A further more specific object of this invention then, is to provide novel interlock means adapted to cooperate with the slide valve and push cup assembly to prevent accidental writing and erasure of the pre-recorded data on a master reel. The means for effecting the interlock may well take the form of a snap ring which may be placed in position while the reel is in a mounted position. The snap ring may also be removed while the reel is in a mounted position. Further, the pneumatic control affected by the placement of the ring on the reel is achieved using the basic elements provided for affecting the pneumatic coupling of the reel to the hub.

Still another object of the invention is to provide a pneumatic interlock for a tape transport mechanism wherein the interlock may be manually effected while the reel is in a mounted position.

The foregoing objects and features of novelty which characterize the invention as well as other objects thereof are pointed out with particularity in the claims annexed to and forming a part of the present specification. For a better understanding of the invention, its advantages and specific objects attained with its use, reference should be had to the accompanying drawings, and descriptive matter in which there is illustrated and described a preferred embodiment of the invention.

Figure 2:
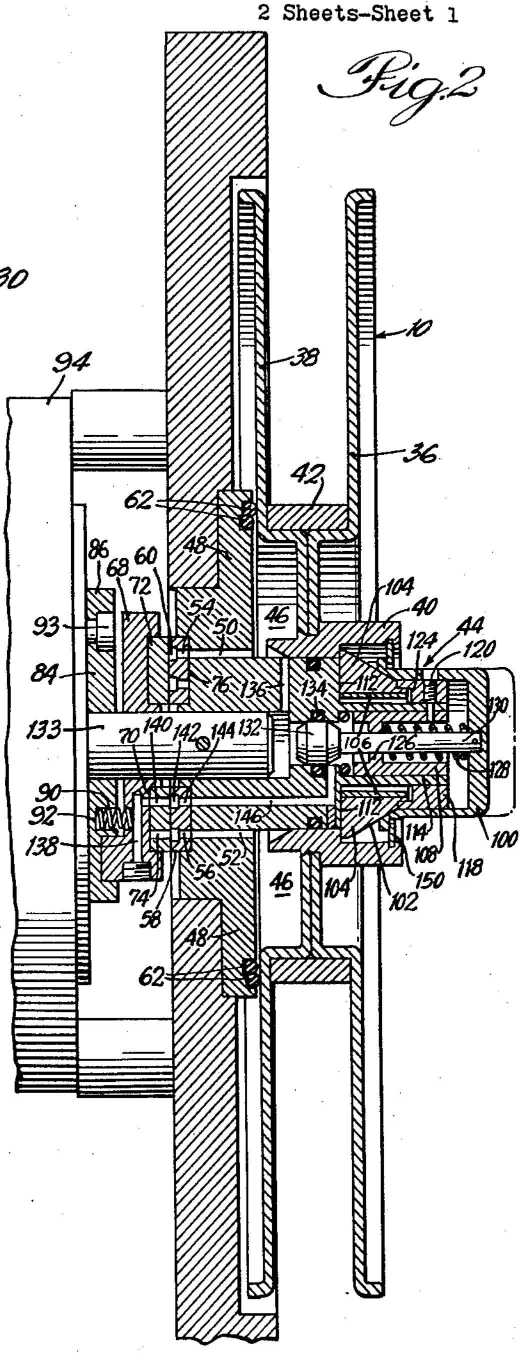
Figure 3:
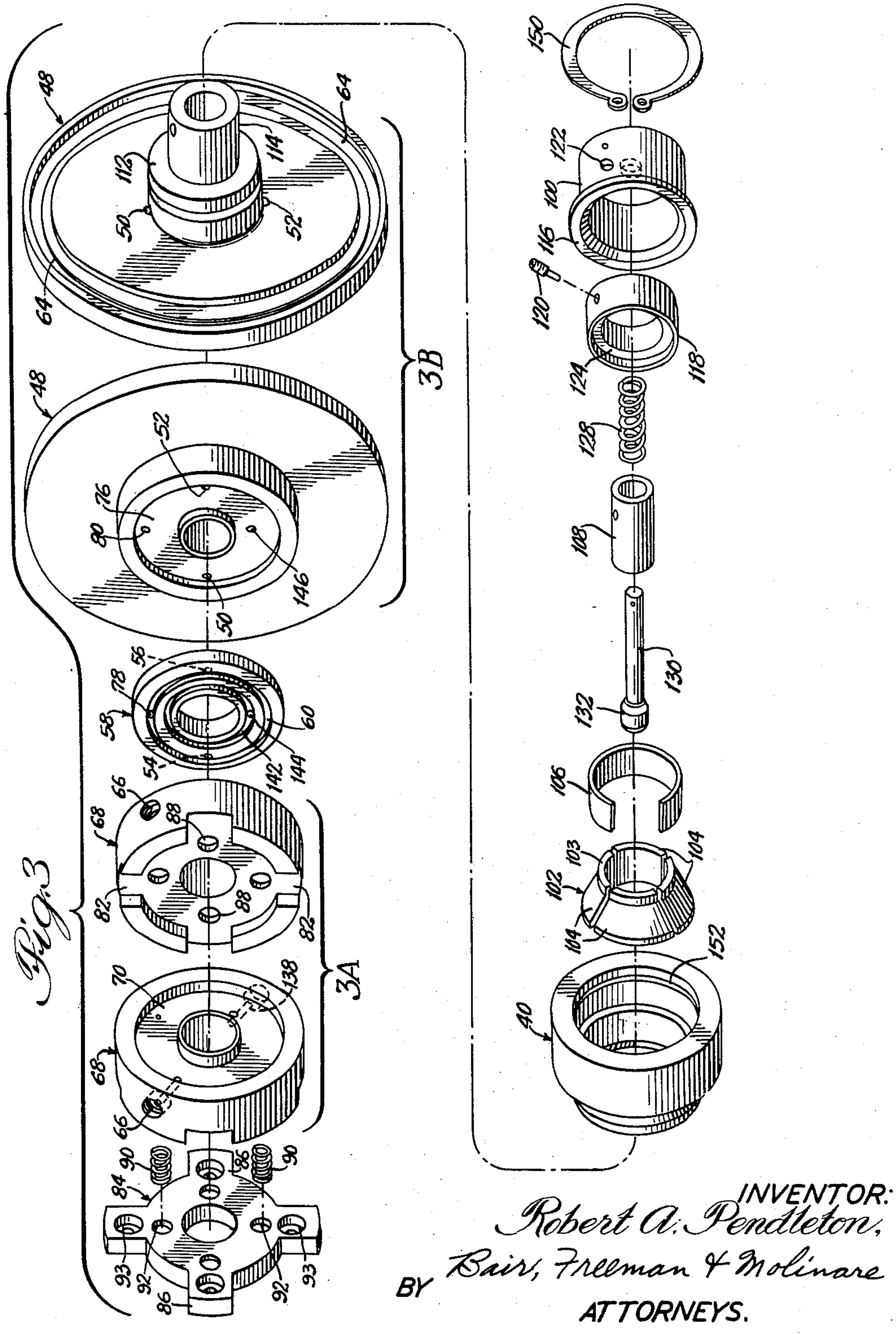

In the drawings:

FIGURE 1 is an illustrative showing of a magnetic tape handling apparatus embodying the principles of the invention;

FIGURE 2 is a cross-sectional view of a reel and drive hub assembly associated with a magnetic tape handling apparatus using the principles of the invention; and FIGURE 3 is an exploded view illustrating the construction of one preferred embodiment of drive hub assembly associated with a reel hub in accordance with the invention, with FIGURE 3A being front and rear views of a stationary seal ring assembly and with FIGURE 3B being front and rear views of a reel drive hub, as embodied in the illustrative apparatus.

Referring now to the drawing, and more particularly to FIGURE 1 thereof, there is illustrated a magnetic tape handling mechanism which is adapted to move a magnetic tape from a supply reel past a data transfer head and to a take-up reel. In accordance with known practices, the tape is adapted to be driven in either direction between the reels, and in either direction past the data transfer head associated with the tape.

More specifically, FIGURE 1 illustrates a first reel 10 and a second reel 12, both of which are adapted to be mounted and driven in accordance with the principles of the present invention. A magnetic tape 14 is wound on the reels 10 and 12, and when the reel 10 is serving as a supply reel, for example, the tape 14 is adapted to be transported from the reel 10 into a first loop chamber 16, the latter providing a desired amount of slack in the tape between the reel 10 and a data transfer mechanism 18. Advantageously, the data transfer mechanism 18 comprises a pair of contra-rotating capstans 20 and 22, respectively, and a brake 24, the latter being used to control the movement of the tape 14 under a data transfer head 26. One mechanism for driving the tape may be of the type described in a patent of the present inventor bearing No. 2,866,637.

A further loop chamber 28 is provided on the other side of the data transfer mechanism 18 and it also provides slack in the tape 14 between the data transfer mechanism 18 and the reel 12. Those skilled in the art will appreciate that, if desired, the loop chambers 16 and 28 may be provided with a subatmospheric pressure or vacuum through suitable ports to maintain a subatmospheric pressure below the loop of the tape in the loop chambers. Further the loop chambers may be provided with means, either pneumatic or optical sensing means, for sensing the depth of the tape 14 within the loop chambers. Thus, in accordance with known practices, the reel drive motors for reels 10 and 12 may be operated under the control of the tape depth sensing means to maintain the tape loops in the loop chambers within a desired range.

In accordance with a specific feature of this invention, the tape reels 10 and 12 are held in operative position with respect to their drive mechanisms by a combination of pneumatic action and mechanical locking action in a manner to be more fully discussed below. Towards this end, the pneumatic means is supplied with a fluid pressure signal in the conduit 30 which, in turn, is coupled to a vacuum source through suitable pneumatic switching and control apparatus.

In accordance with a further feature of this invention, the accidental writing or erasure of data on a master magnetic tape is prevented by a unique pneumatic interlock, also more fully discussed below. Towards this end, the pneumatic interlocking means is supplied with a fluid pressure signal in conduit 32, which, in turn, is coupled to a vacuum source through suitable pneumatic switching and control apparatus. In addition, the conduit 32 is coupled to a vacuum switching means 34 which provides an output to the writing and erase control circuits in response to the condition of fluid pressure within the conduit 32.

The operation of the invention, and the manner in which the reel drive hub assembly is constructed will be understood by a more detailed consideration of FIGURES 2 and 3.

Referring first to FIGURE 2, there is shown in cross-sectional detail a tape supply reel as well as the drive shaft and drive hub assembly therefor in accordance with the invention.

As illustrated in FIGURE 2, the reel 10 comprises a front flange 36, a rear flange 38, a reel hub 40, and a ring band 42. The tape handled by reel 10 normally will be wound around the ring band 42, and the front and rear flanges 36 and 38 function as guide members for the tape as it is being passed from or fed onto the reel.

As clearly shown in FIGURE 3 of the drawing, the cylindrical reel hub 40 advantageously is provided with a circular opening through which a unique drive hub assembly 44 is adapted to be fitted. When the reel 10 is operatively positioned on the drive hub assembly 44, a closed annular chamber 46 is defined by the rear flange 38 and hub 40 of reel 10, and the reel drive hub 48 of the drive hub assembly 44. Subatmospheric pressure is communicated to the chamber 46, in the manner described below, to create a pressure differential on the reel since atmospheric pressure will be acting on the outer sides of the reel flanges 36 and 38. This pressure differential forces reel 10 to the left, as viewed in FIGURE 2, against a drive hub 48. In particular, this differential pressure forces reel 10 into firm engagement with the resilient sealing rings 62 mounted in the annular grooves 64 in the outer face of drive hub 48.

The subatmospheric pressure in chamber 46 is supplied from a suitable vacuum source and the conduit 30 through a fluid pressure communication port 66, shown in FIGURE 3, which may be drilled and tapped in the stationary seal ring 68. The port 66 is in communication with an annular groove 70 cut in the outer face of stationary seal ring 68. The stationary seal ring 68, which advantageously may be formed of aluminum, is placed in abutting relationship with a stationary seal ring 72, shown only in FIGURE 2, but having the same shape and form as the seal ring 58 shown in FIGURE 3 and which advantageously may be formed of carbon, adapted to be fitted in the annular groove 70. The stationary seal ring 68 and the stationary seal ring 72 may be assembled and sealed together by a suitable sealing compound or cement with the two rings being oriented so that the port 74 in ring 72 is matched with the inner opening of the port 66 in the ring 68.

The rotating seal ring 58, which advantageously may be formed of carbon, is positioned in abutment with the stationary seal ring 72. An annular groove 60 is provided on the inner face of rotating seal ring 58 in matching relationship with the port 74 in the stationary seal ring 72. A pair of pressure ports 54 and 56 extend through the rotating seal ring 58 and are in communication with the annular groove 60 so that the subatmospheric pressure is supplied therethrough.

Advantageously, the reel drive hub 48 is provided with an annular ring 76 cut in its inner face into which the rotating seal ring 58 is adapted to be positioned. In the course of the assembly of the apparatus, the seal ring 58 normally will be mounted and sealed in position by a suitable sealing compound or cement, with the seal ring 58 being oriented in its position on the drive hub 48 by a dowel adapted to be inserted through the holes 78 and 80. Thus, it can be seen that the ports 54 and 56 in seal ring 58 are matched with the ports 50 and 52 in the drive hub 48 to enable the subatmospheric pressure to be communicated to the chamber 46 for locking the reel 10 in coupled engagement with the reel drive hub 48.

The inner face of the stationary seal ring 68 is provided with four radial slots 82 cut therein, said slots 82 being adapted to cooperate with the arms 86 of a retainer 84, as illustrated in FIGURES 2 and 3. The inner face of the stationary seal ring 68 additionally has holes drilled therein, as at 88, into which the compression springs 90 may be placed so as to bias the stationary seal ring 72 firmly against the rotating seal ring 58. The compression springs 90, of which only two of the four utilized are shown in FIGURE 3, also are fitted into a series of holes 92 drilled in the outer face of retainer 84 to facilitate the biasing of the stationary seal rings into position. In addition, the arms of seal ring retainer 84 are drilled and counter-bored, as at 93, for purposes of providing a passage for fastening screws to enable the stationary seal ring and retainer assembly to be securely mounted to the motor housing 94.

In addition to the firm coupling of reel 10 to the drive hub 48 by the subatmospheric pressure supplied to chamber 46, as described above, it is a feature of this invention that the reel is positively locked to the driving mechanism by unique mechanical clamping means which automatically clamps the reel to the motor spindle when the reel is operatively positioned thereon and which may easily be released to permit the reel to be removed. Those skilled in the art will readily appreciate that the combination of pneumatic coupling and mechanical clamping provided by the present invention effectively serves to prevent the danger of the reel becoming loose and flying off of the spindle while it is rotating at high speeds. The double protection afforded by the invention has proved highly satisfactory, while at the same time, the ease and convenience of reel coupling and uncoupling provided by the invention has proved highly advantageous in the operation of magnetic recording and playback apparatus.

As shown in FIGURES 2 and 3 of the drawing, the mechanical clamping apparatus in one preferred embodiment comprises a manually actuable member 100 and an associated collapsible lock member 102. The collapsible lock member 102 is formed with a cylindrical base portion 103 and a plurality of resilient fingers 104 formed of nylon or the like, which flare out radially from said base portion as shown in FIGURE 3. The slots 105 are provided between each pair of adjacent resilient fingers 104 to enable said fingers to be pressed in radially when mechanical pressure is applied thereto, or to enable said fingers to return to their normal position shown when the mechanical pressure is removed.

A C-shaped spring clip member 106 is inserted within the opening defined by the base portion 103 and fingers 104 of the collapsible lock member 102. As shown in FIGURE 2, the collapsible lock member 102 and the spring clip member 106 are positioned around the outer cylindrical extension 114 of the drive hub 48 and in abutment with the end face of annular shoulder 112 thereof.

In accordance with a feature of the illustrative embodiment of the invention disclosed in the drawings, the manually actuatable member 100 advantageously is cup-shaped with an outwardly extending circular flange 116 provided at its inner edge. A cylindrical inner sleeve or slide shaft guide 108 is positioned within the drive hub cylindrical extension 114 and a cylindrical collar 118 is positioned around the outer end of drive hub cylindrical extension 114. Collar 118, drive hub extension 114 and slide shaft guide 108 are provided with suitable threaded openings to the end that these components are adapted to be combined into a unitary assembly by the set screw fastener 120.

Advantageously, the cup-shaped member 100 is provided with an aperture 122 through which a screw driver may be inserted to enable the set screw 120 to be tightened into position. Additionally, it can be seen that the collar 118 may be provided with an inner shoulder portion 124 for receiving the base portion 103, of the collapsible lock member 102.

The slide shaft guide 108 is provided with an inwardly extending annular flange 126 and a compression member, such as a coil spring 128, is adapted to be operatively positioned between the guide flange 126 and the cup-shaped member 100. Thus, those skilled in the art will now appreciate that the cup-shaped member 100 normally is biased outwardly by the action of coil spring 128, but that the member 100 may be manually actuated inwardly against the biasing force of the coil spring to cause the flanged edge 116 of member 100 to press the resilient fingers 104 of the collapsible lock member 102 towards the axis of said member. The cup-shaped member 100 is guided in its inward or outward movement by a slide shaft 130 which is secured at one end thereof to the member 100 and which is adapted to slide at the other end thereof through the central opening defined by the annular flange 126 within the slide shaft guide 108.

The operation of the mechanical clamping means for the reel will now be described. When the reel 10 is to be coupled to the drive hub assembly 44, for rotation by the reel motor spindle 133, the reel hub 40 is slipped over the cup-shaped member 100 with the result that the resilient fingers 104 of the collapsible lock member 102 are depressed until the rear flange 38 of reel 10 engages the sealing rings 62 in the drive hub 48. At this time, the resilient fingers 104 are freed and return to their normal position to clamp the reel hub 40 to its drive mechanism and thereby prevent the reel 10 from becoming uncoupled or flying loose therefrom. This clamping action of the collapsible lock member 102 on the hub 40 of reel 10 is shown in FIGURE 2 of the drawing. At the same time, in the manner described above, the pneumatic locking action of the subatmospheric pressure in the chamber 46 serves to firmly couple the reel 10 to the drive hub 48, thereby providing a two-fold coupling and protective action.

In accordance with a further feature of this invention, a valve 132 is secured to the inner end of the slide shaft 130 and is positioned within an internal axial opening of the reel drive hub 48. In the position shown in FIGURE 2, the valve 132 is in sealing engagement with the resilient sealing ring 134, and since no atmospheric pressure can pass the valve, the subatmospheric pressure condition of chamber 46 is maintained. When the removal of reel 10 is desired, this can easily be effected by the inward actuation of the cup-shaped member 100. This not only serves to push the slide shaft 130 and the valve 132 inwardly, but in addition, the flanged edge 116 of the member 100 depresses the resilient fingers 104 of the collapsible lock member 102.

It now will be understood that the inward movement of valve 132 permits atmospheric pressure to vent the chamber 46 by means of the fluid conduit 136 to relieve the pressure differential thereat and thereby release the pneumatic coupling between the reel 10 and the drive hub 48. At the same time, and as a result of the same inward actuation of cup-shaped member 100, the depression of resilient fingers 104 of the collapsible lock member 102 releases the mechanical clamp on the reel hub 40 to permit reel 10 to readily be removed from the drive mechanism. Since both clamping actions are released by the actuation of the member 100 by one hand of the operator, the operator is free to use his other hand to remove the reel.

In accordance with a further feature of this invention, unique interlock means are provided to prevent the accidental writing or erasure of data from a master tape reel. Towards this end, the stationary seal ring 68 is provided with a fluid pressure communication port 138 which may be drilled and tapped therein, as shown in FIGURE 3A. Port 138 is in fluid pressure communication with a suitable vacuum source and a vacuum switch 34, by means of the conduit 32, such that subatmospheric pressure is supplied to the port 140 of the stationary seal ring 72, which is matched to port 138. Port 140 is in communication with the annular groove 142 cut into the inner face of the rotatable seal ring 58 such that the subatmospheric pressure is supplied through port 144 of seal ring 58 and port 146 of the reel hub 40 to the slide valve 132.

In the position shown in FIGURE 2, the slide valve 132 does not cover or seal the port 146 with the result that atmosphere leaks through the fluid pressure conduits just described to control the vacuum switch 34. This position of the slide valve results from the cup-shaped member being in its half-cocked or interlocked position. This end is effected by providing each master reel with a snap or retainer ring 150 fitted with a suitable groove 152 formed around the interior surface of the reel hub 40.

Thus, when the reel 40 is operatively positioned on its drive mechanism, the retainer ring 150 engages the outer flanged edge 116 of member 100 to move the latter from the dotted line position to the solid line position, as shown in FIGURE 2. This action vents or leaks atmosphere into the conduit 32, as explained above and serves to control the vacuum switch 34 to selectively control the writing or erasure of data on a master reel.

Reels which are not master reels are not provided with the retainer ring 150 on their hubs, and it will be appreciated that when such reels are used the cup-shaped member 100 is in its outermost or dotted line position. At this time the valve 132 seals the port 146 so that the subatmospheric pressure in conduit 32 is not vented and the vacuum switch 34 may be suitably operated. Thus, for example, writing and erasure of tape data may be effected with normal reels without the retainer ring 150, but the use of such retainer ring in all master reels automatically interlocks these circuits and prevents accidental writing and erasure of master data. Obviously, the function of the switch 34 may be reversed from the aforesaid control action.

While I have shown and described a specific embodiment of the present invention it will, of course, be understood that various modifications and alternative constructions may be made without departing from the true spirit and scope of the invention. It is therefore, intended by the appended claims to cover all such modifications and alternative constructions as fall within their true spirit and scope.

What is claimed as the invention is:

1. The combination comprising a reel, a support hub assembly for said reel, pneumatic means connected to said support hub assembly for applying a fluid pressure to a single chamber formed directly by surfaces of said reel and support hub assembly and positioned between said reel and said support hub assembly so that said pressure will act directly on said surfaces to firmly couple the reel to the support hub assembly for rotation therewith, and manually operable valve means connected to and positioned to be an integral part of said support hub assembly and being adapted when operated to relieve said fluid pressure for decoupling said reel from said support hub assembly, said valve means having an actuator therefor positioned on said hub assembly to be accessible through said reel.

2. The combination comprising a reel, a rotatable hub assembly for supportingly receiving said reel, said reel and hub assembly defining a single normally closed chamber therebetween and formed by the adjacent surfaces of said reel and hub assembly, pneumatic means connected to said support hub assembly for applying subatmospheric pressure to said normally closed chamber to firmly couple the reel to the support hub assembly for rotation therewith, and manually operable slide valve means connected to and being positioned to be an integral part of said support hub assembly and further being adapted when operated to vent said chamber with atmospheric pressure for enabling said reel to be decoupled from said support hub assembly said slide valve means having an actuator that is accessible through said reel.

3. The combination comprising a reel, a rotatable support hub assembly for said reel, said reel and said hub assembly being positioned adjacent to each other but being spaced apart by a spacing means to define with said spacing means a normally closed chamber therebetween, pneumatic means connected to said support hub assembly for applying subatmospheric pressure to said normally closed chamber to firmly couple the reel to the support hub assembly for rotation therewith, and manually operable means connected to said support hub assembly and said chamber to selectively vent said chamber with atmospheric pressure for decoupling said reel from said support hub assembly, said manually operable means comprising valve means positioned for movement along the central axis of said hub assembly and positioned to extend through said reel when supported by said hub assembly, a fluid pressure port placing said valve means in communication with said normally closed chamber, and resilient positioning means normally biasing said valve means in sealing position to maintain the subatmospheric pressure in said chamber.

4. The combination comprising a reel, a support hub assembly for said reel, a pneumatic chamber formed by adjacent surfaces of said reel and said support hub assembly when said reel is in position on said hub assembly pneumatic means connected to said support hub assembly for applying a fluid pressure to said chamber to lock said reel in position on said support hub assembly, selectively actuatable mechanical clamping means on said support hub assembly positioned to automatically clamp said reel to said support hub assembly when the reel is positioned thereon, a mechanical actuator coupled to said clamping means to disengage said clamping means, valving means coupled to said chamber, and manually operable means on said support hub assembly connected to engage said actuator and said valving means and adapted when operated to release said mechanical clamping means and to render inoperative said pressure to engage said reel to be removed from said support hub assembly.

5. The combination comprising a reel, a support hub assembly for said reel, pneumatic means connected to said support hub assembly for applying a fluid pressure to a space between said reel and said hub assembly to lock said reel in position on said support hub assembly, clamping means comprising a plurality of spring-biased mechanical fingers associated with said support hub assembly, said fingers serving, in addition to said pneumatic means, to automatically clamp said reel to said support hub assembly when the reel is positioned thereon, and manually operable mechanical means on said support hub assembly positioned to mechanically engage said fingers and, when operated, to position said mechanical fingers in a non-clamping position to enable said reel to be removed from said support hub assembly and to render inoperative said pressure.

6. In combination, a drive hub for a reel, a reel adapted to be removably mounted on said drive hub, pneumatic holding means including a pneumatic pressure source coupled to said hub and reel to firmly couple said reel to said hub, a selectively operable control means mounted on said drive hub, said control means comprising a pneumatic slide valve member having an actuator adapted to project along the rotating axis of said hub, means biasing said valve member to a predetermined position, a first pneumatic control conduit connected between said pneumatic pressure source and said pneumatic holding means, a second pneumatic control conduit connected between said pneumatic pressure source and a further control means, an elongated valving means including said pneumatic slide valve member having said first and second pneumatic control conduits connected thereto along the length thereof so that axial movement of said actuator will activate said slide valve member with respect to said first and second conduits in accordance with the extent of movement of said valve member along the length of said valving means, and a control element adapted to be removably mounted on said reel to engage said actuator to hold said valve member in a position displaced from said predetermined position within said valving means to selectively regulate the connection of said pneumatic pressure source to said second control conduit when said reel is mounted on said drive hub.

References Cited in the file of this patent

UNITED STATES PATENTS

| | | |
|---|---|---|
| 696,137 | Felbel | Mar. 25, 1902 |
| 907,760 | Evensen | Dec. 29, 1908 |
| 1,313,631 | Hagerstrom | Aug. 19, 1919 |
| 1,678,710 | Selvig | July 31, 1928 |
| 2,338,693 | Dolan | Jan. 4, 1944 |
| 2,612,565 | Heller | Sept. 30, 1952 |
| 2,882,078 | MacDonald | Apr. 14, 1959 |
| 2,889,123 | Hayden | June 2, 1959 |
| 2,922,594 | Pawlowski | Jan. 26, 1960 |
| 2,986,443 | Leutert | May 30, 1961 |
| 2,998,206 | Pendleton | Aug. 29, 1961 |
| 3,053,467 | Gidge | Sept. 11, 1962 |

FOREIGN PATENTS

| | | |
|---|---|---|
| 638,353 | Germany | June 18, 1937 |
| 600,158 | Great Britain | Apr. 1, 1948 |